United States Patent [19]
Patton et al.

[11] 3,802,789
[45] Apr. 9, 1974

[54] BALL JOINT FOR SUSPENSION

[75] Inventors: Delane D. Patton, Worthington; Joseph Smith, Columbus, both of Ohio

[73] Assignee: Columbus Auto Parts Company, Columbus, Ohio

[22] Filed: Aug. 21, 1972

[21] Appl. No.: 282,426

[52] U.S. Cl. ............................................. 403/135
[51] Int. Cl. ........................................ F16c 11/06
[58] Field of Search ........ 287/87, 90 R, 90 B, 90 C, 287/21, 12; 138/89, 96; 403/135, 133, 132, 138

[56] References Cited
UNITED STATES PATENTS

| | | |
|---|---|---|
| 2,718,411 | 9/1955 | Geerds .............................. 287/90 R |
| 917,847 | 4/1909 | Corey ................................. 287/21 |
| 3,675,685 | 7/1972 | Potter ................................. 138/89 |
| 2,942,901 | 6/1960 | Booth ............................... 287/90 R |

Primary Examiner—Reinaldo P. Machado
Attorney, Agent, or Firm—Harness, Dickey & Pierce

[57] ABSTRACT

A ball joint for the suspension of an automotive vehicle. A ball stud has its ball end pivotally supported in a housing socket. A pair of small plastic buttons are positioned on the non-weight bearing side of the socket wall. The buttons are compressed and extruded between the ball and the socket during the assembly of the joint to take up clearance between the parts and preload the joint.

5 Claims, 4 Drawing Figures

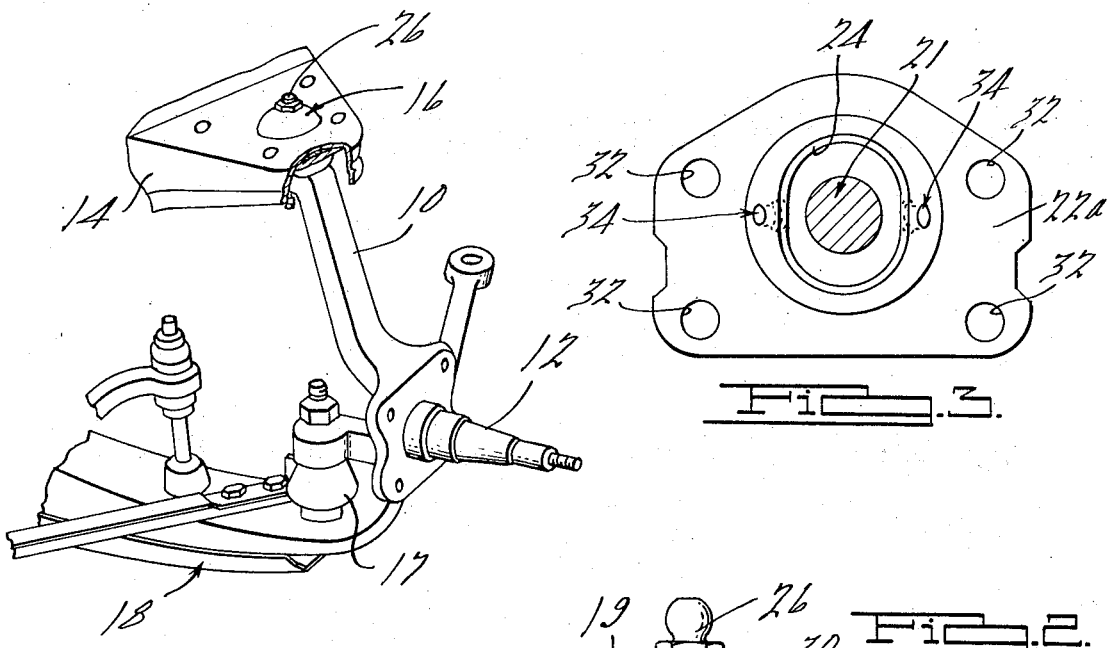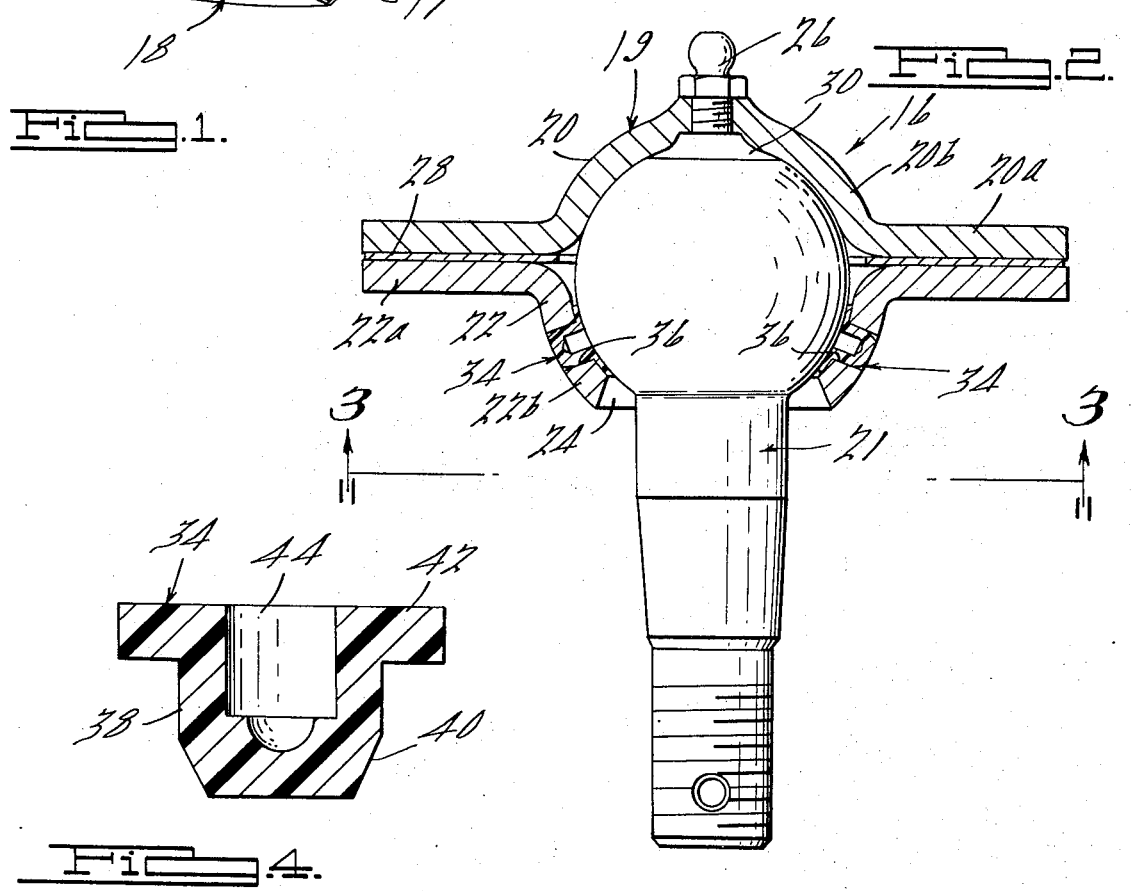

BALL JOINT FOR SUSPENSION

SUMMARY OF THE INVENTION

Ball joints for automotive steering linkages have traditionally employed bearings and springs by which the ball has been held very tightly in its socket. The spring preloads the joint so that a predetermined amount of torque is required to rotate the stud. A steering linkage ball joint does not serve the function of supporting any of the weight of the vehicle and has substantially different requirements than a ball joint employed in an automotive vehicle suspension. Ball joints for a vehicle suspension have not generally employed separate bearings or means for preloading the joint. In most automotive suspension ball joints the ball end of the stud is simply captured in a stamped sheet metal housing with nothing but grease between the ball and the wall of the socket housing. Due to tolerance variations between the socket and the ball, some play or clearance may exist between the ball and the wall of the socket. However, any movement of the stud within its socket, other than rotary movement, is frequently interpreted by mechanics installing a new ball stud as being indicative of an improperly manufactured or defective product. When a vehicle is placed on a hoist and supported by its frame, the ability of a mechanic to move the wheel and wheel spindle relative to suspension control arms is also interpreted as evidence of excessively worn ball studs. The degree to which such "end play" actually affects the functioning of the suspension during normal road operation of the vehicle is subject to various interpretations. Nevertheless, the detection of stud end play in a suspension ball joint, either upon the installation of a new joint or during periodic maintenance inspections is regarded as undesirable. However, the usual bearings and springs employed in steering linkage ball joints are not a desirable approach to remedying this problem in a suspension ball joint. The weight bearing requirements of the joint and the substantial forces to which it is subjected are quite likely to damage the springs or bearings employed in steering linkage type ball joints. Furthermore, they add substantially to the cost of the joint.

It is therefore an object of the present invention to provide a suitable suspension ball joint which is preloaded and eliminates undesired end play of the ball stud but which is low in cost, of a rugged, long lasting and reliable character and which is convenient to assemble.

This object is achieved by the use of small plastic inserts positioned on a non-weight bearing wall of joint sockets. The inserts are readily deformable to take up clearance between the ball and socket and preload the joint.

BRIEF DESCRIPTION OF THE DRAWINGS

FIG. 1 is a perspective view of an automotive suspension employing a ball joint made in accordance with the present invention;

FIG. 2 is an enlarged vertical sectional view of the ball joint employed in the structure of FIG. 1;

FIG. 3 is a reduced scale sectional view of the structure illustrated in FIG. 2, taken along the line 3—3 thereof; and FIG. 4 is an enlarged sectional view of the plastic insert member employed in the ball joint of FIGS. 1-3, illustrating the shape of this member before the assembly of the joint.

DETAILED DESCRIPTION OF THE PREFERRED EMBODIMENT

FIG. 1 shows a vehicle suspension for the front end of a typical passenger car. This suspension includes a steering knuckle 10 having an integral wheel spindle 12 on which the hub, wheel and tire (not shown) are mounted. The steering knuckle 10 is joined at its upper end to an upper control arm 14 by an upper ball joint 16 and at its lower end to a lower control arm 18 by a lower ball joint 17.

The upper ball joint 16 is shown in detail in FIGS. 2 and 3 and will be seen to include the two part housing 19 and a ball stud 21. The two part housing includes an upper stamping 20 and a lower stamping 22. The upper stamping 20 has a flat peripheral flange portion 20a provided with a central segmentally spherical depression 20b. The lower stamping 22 has a flat annular flange portion 22a and a segmentally spherical depression 22b provided with a central opening 24 therein. A grease plug 26 is threaded through the stamping 20 at the middle of the depression 20b. The two stampings 20 and 22 are welded together with a gasket 28 therebetween. Openings (not shown) are provided in the gasket 28 to permit the welding of the flange portions 20a and 22a through such openings. The depressions 20b and 22b cooperate to define a segmentally spherical socket 30. As seen in FIG. 3 openings 32 extend through the flange portions 20a and 22a to permit fasteners to extend therethrough and connect the ball joint 18 to the upper control arm 14.

The present invention is particularly distinguished by the presence of a pair of plastic buttons or insert members, indicated generally at 34, affixed to the stamping 22 in the depression 22b thereof. The stamping 22 will be seen to have a pair of openings 36 extending therethrough on opposite sides of the depression 22b. Each button 34 has a cylindrical portion 38 which is press fit in one of the openings 36, the press fit being facilitated by the provision of a chamfer 40 at one end of the button. At the opposite end of the button 34 is a radial flange portion 42 of a greater diameter than the cylindrical portion 38 and lying against the wall of the socket 30. A blind bore 44 extends from the one end of the button 34 through the flange 42 and into the cylindrical portion 38.

The functioning of the suspension is such that a portion of the weight of the vehicle is supported through the ball joint 16 on the depression 20b. Thus, as viewed in FIG. 2, the upper half of the cavity 30 constitutes the weight bearing side of the socket. It will therefore be appreciated that buttons 34 are positioned on the non-weight bearing side of the socket 30. It will furthermore be seen that each button 34 has an annular flange 42 which is substantially thicker (in a direction radially of the ball of the ball stud 21) as viewed in FIG. 4, than as viewed in FIG. 2. The reason for this is that the flange 42 is squeezed between the ball of the ball stud 20 and the wall of the socket 30 during the assembly of the stampings 20 and 22. Prior to the assembly of such stampings the buttons 34 are press fit into the openings 36. The parts are then held together under substantial pressure while the flanges 20a and 22a are welded together. The holding of such parts together under pressure flattens the flanges 42 and extrudes them outwardly. By this means the flanges 42 automatically take up any clearance which exists between the ball of the ball stud 20 and the wall of the socket 30. Furthermore, the flanges 42 are held under compression to preload the ball stud 20 and cause it to be gripped by the housing 19. The bore 44 facilitates the outward flow of the material of the flange 42.

Due to the fact that the buttons 34 are positioned on the non-weight bearing side of the joint, the substantial forces applied to the joint 16 through bumps and other obstacles occurring on the road will not have a tendency to further flatten or extrude the flanges 42. Rather, the flanges 42 continue to take up clearance within the socket 30 and hold the ball stud 20 against undesired end play.

The thickness of the flanges 42 of the buttons 34 is carefully selected so as to be greater than the maximum clearance created by manufacturing tolerances between the socket 30 and the ball stud 20.

The buttons 34 are desirably made from polyethylene which is sufficiently deformable to extrude out of the way when a minimum clearance exists between the steel parts. As is usual in the case of ball joints, the ball stud 21 and the housing 19 are manufactured from steel. Due to the relatively wide spacing of the buttons 34, ample room is provided for the flow of material of the flanges with a balanced loading on opposite sides of the ball. The loading and severe force act on the upper half of the socket 30 and there is a minimal tendency for destructive forces to be transmitted to the buttons 34.

What is claimed is:

1. A vehicle suspension ball joint including a closed housing having a segmentally spherical socket, a ball stud having a ball portion disposed in said socket and a stud portion projecting from said socket and a plurality of spaced readily permanently deformable insert members fixed to a non-weight bearing wall of said socket and engage a relatively minor portion thereof, said insert members being in engagement with said ball portion and biasing said ball portion against an opposing wall of said socket.

2. The structure set forth in claim 1 in which said non-weight bearing wall has a plurality of openings formed therein and in which said insert members are press fit in said openings.

3. The structure set forth in claim 2 in which said insert members have a cylindrical portion disposed in said openings and an annular flange lying against the wall of said socket.

4. The structure set forth in claim 3 in which said insert members have openings formed in the middle of their flanges.

5. A vehicle suspension ball joint arranged in a weight supporting position between a vehicle body and a wheel of the vehicle, said joint including a closed housing having a segmentally spherical socket, a ball stud having a ball portion disposed in said socket and a stud portion projecting from said socket, said socket having a first wall portion on which a portion of the vehicle weight is transferred between said housing and said ball portion and a second non-weight bearing wall opposed to said first wall portion, and a plurality of spaced synthetic resinous insert members positioned on said non-weight bearing wall and biasing said ball portion into engagement with said weight bearing wall portion.

* * * * *